United States Patent [19]

Fukuma et al.

[11] Patent Number: 4,828,385

[45] Date of Patent: May 9, 1989

[54] AUTOLENSMETER

[75] Inventors: Yasufumi Fukuma; Akihiro Arai, both of Tokyo, Japan

[73] Assignee: Tokyo Kogaku Kikai Kabushiki Kaisha, Tokyo, Japan

[21] Appl. No.: 29,728

[22] Filed: Mar. 24, 1987

[30] Foreign Application Priority Data

Mar. 25, 1986 [JP] Japan ............................. 61-43758[U]

[51] Int. Cl.$^4$ .............................................. G01B 9/00
[52] U.S. Cl. .................................... 356/125; 356/127
[58] Field of Search ................. 356/124, 125, 126, 127

[56] References Cited

U.S. PATENT DOCUMENTS

| | | | |
|---|---|---|---|
| 3,880,525 | 4/1975 | Johnson | 356/127 |
| 4,275,964 | 6/1981 | Vassiliadis | 356/125 |
| 4,370,058 | 1/1983 | Trotscher et al. | 356/125 |
| 4,641,961 | 2/1987 | Yamada | 356/127 |
| 4,641,964 | 2/1987 | Mitani et al. | 356/125 |

FOREIGN PATENT DOCUMENTS 591991  10/1947  United Kingdom ................ 356/126

Primary Examiner—Richard A. Rosenberger
Attorney, Agent, or Firm—Finnegan, Henderson, Farabow, Garrett & Dunner

[57] ABSTRACT

An autolensmeter for inspecting refracting power of optical systems is herein disclosed, which comprises a collimater lens for projecting light from a light source onto an optical system to be examined as a parallel luminous flux, a mask means having a mask pattern for selectively transmitting the luminous flux from the optical system and a photodetecting means for receiving the luminous flux partially transmitted through the mask pattern, disposed at a non-image forming position of the optical system, characterized in that an optical element is arranged in close vicinity of the mask pattern so that the light source and the photodetecting means are in an optical conjugate relationship with each other. The autolensmeter makes it possible to enlarge the width of the effective luminous flux for measuring the refracting power of the optical system without reducing the sharpness of the pattern projected on the photodetecting means and thereby eliminating the requirements for the use of photodetecting means of a high sensitivity and light sources of a high luminance and the accuracy of measurement being not influenced by the presence of, for instance dusts and/or water drops on the optical system and/or the mask means.

5 Claims, 4 Drawing Sheets

AUTOLENSMETER

BACKGROUND OF THE INVENTION

1. Field of the Invention

The present invention relates to an autolensmeter, more particularly to an autolensmeter for automatically measuring refracting power of lens such as those for eyeglasses or contact lens, i.e., refracting powers such as spherical power, cylindrical power, inclination of cylindrical axis and prism power.

2. Description of the Prior Art

When a person has normal eyesight, the images of a distant object or the like is accurately formed on the retina of his eyes. However, not all human eyes are normal and a variety of eyeglasses or contact lens are required depending on whether a person is short-sighted, far-sighted or the like. On the other hand, if a spectacle maker or eyeglass factory makes eyeglasses, it is required that lens having a specific refracting power are provided according to the visual acuity of a specific person. For that purpose, an autolensmeter has been developed and has practically been used to determine refracting power of optical systems such as a lens for eyeglasses or the like.

An example of such autolensmeter is disclosed in Japanese Patent laid-open No. 57-29923 filed by Hiroshi Tamaki and assigned to same assignee of this application. The apparatus is a so-called non-image formation type one in which a means for detecting light is disposed before the focal point of a lens to be examined. According to this apparatus, the refracting power may be determined by observing the shape and/or position of a projected pattern received by the means for detecting light and comparing them with those of the mask pattern per se to estimate change or deformation observed therebetween.

In such apparatus, the width of the mask pattern should be narrowed so as to assure sharpness of the pattern projected on a photodetecting surface of the photodetecting means. This, in turn, leads to the reduction in the width of an effective luminous flux used to determine refracting power of lens to be examined. Therefore, it is needed to use expensive elements such as a highly sensitive element for detecting light or a light source of high luminance because of the low quantity of light projected on the photodetecting means.

Moreover, in the apparatus of this type, there are various factors which influences on the accuracy of measurement, such as external scattering factors inclusive of deposition of dusts and/or water drops on the lens and/or the mask pattern.

SUMMARY OF THE INVENTION

As seen from the foregoing description, the conventional apparatus has a lot to disadvantages to be eliminated. Consequently, there has been a strong need for an autolensmeter which suffers no such disadvantage and on the contrary, provides an extremely high accuracy of measurement and makes it possible to eliminate the use of such expensive elements.

Accordingly, the principal object of this invention is to provide an autolensmeter which permits the use of a large or wide effective luminous flux for measurement of refracting power.

Another purpose of this invention is to provide an autolensmeter in which the accuracy of measurement is not substantially influenced by external scattering factors such as the presence of dust and/or water drops on lens to be examined and/or a mask pattern.

The aforementioned and other objects of this invention can be achieved by providing an autolensmeter which comprises a collimator lens for projecting light from a light source onto an optical system to be examined as a parallel luminous flux; a mask means having a mask pattern for selectively transmitting luminous flux from the optical system to be examined; and a photodetecting means for receiving light flux partially transmitted through the mask pattern, disposed at a position which is a non-image forming position of the optical system. The autolensmeter of the present invention is characterized in that an optical element is arranged at the vicinity of the mask pattern, which makes the light source and the photodetecting means optically conjugate with each other.

BRIEF DESCRIPTION OF THE ATTACHED DRAWINGS

The autolensmeter according to the present invention will now be described in more detail referring to the accompanying drawings; wherein FIG. 1 is a vertical sectional view taken along the center line and showing the optical arrangement of an embodiment of the autolensmeter according to the present invention;

DETAILED EXPLANATION OF THE INVENTION

Figure 6:
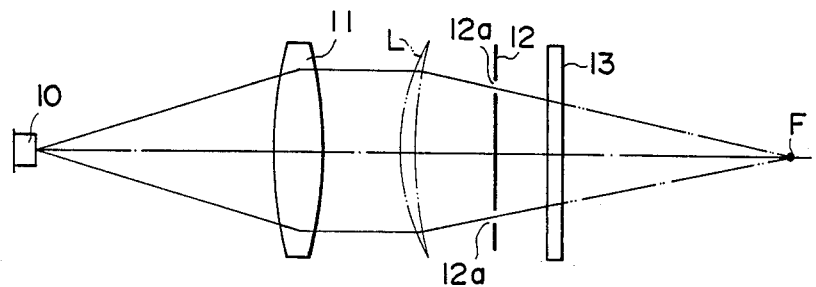
FIG. 6 is a schematic diagram illustrating the optical arrangement and light path of the conventional autolensmeter.

An autolensmeter conventionally proposed has, for example, a structure or construction schematically shown in the attached FIG. 6. The autolensmeter comprises, as seen from FIG. 6, a collimator lens 11 which converts light from a light source 10 to a parallel luminous flux; a mask 12 having mask patterns 12a, which is disposed behind the collimator lens 11 and selectively transmits incident light through the mask pattern and a two-dimensional type photodetecting means 13 such as an area CCD (charge coupled device) which receives luminous flux transmitted through the mask means 12. According to this apparatus, a lens L to be examined is placed between the collimator lens 11 and the mask means 12 and further the photodetecting means 13 is arranged before the focal point F of the lens L. Thus, the apparatus has a so-called non-image forming type construction.

Figure 7:
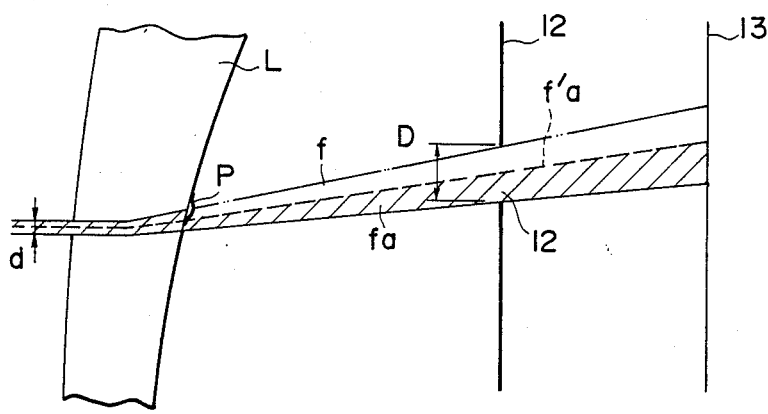
FIG. 7 is a schematic diagram for explaining the measurement of refracting power of the lens to be examined by the conventional autolensmeter shown in FIG. 6.

However, the conventional autolensmeter of this type suffers a variety of disadvantages as already mentioned above. The refracting power or refractive power of lens L to be examined is in general determined by inserting the lens L between the collimator lens 11 and the mask means 12, switching on the light source 10 to transmit light to the lens L through the collimator lens 11, observing shape and/or position of a pattern projected on the light-detecting means 13 and comparing them with those the mask pattern 12a per se to estimate change or difference therebetween, if the autolensmeter shown in FIG. 6 is used. In this connection, to assure the accuracy of measurement and the sharpness of the pattern projected on a photodetecting surface of the photodetecting means 13, the width D of the mask pattern 12a formed on the mask means 12 should be as narrow as possible (see, FIG. 7). This, in turn, leads to the reduction in the width d of an effective luminous flux f which serves to measure the refracting power of the lens L. Accordingly, the amount of light projected on the photodetecting means 13 is substantially limited to a quite low level and as a result, it is required to use a highly by sensitive element for detecting light and/or a light source of high luminance which are quite expensive.

On the other hand, if there are external scattering factors P such as the deposition of dust and/or water drops on the lens L and/or the mask pattern, the deflection of the effective luminous flux f is possively caused because of the presence of such obstacles and is not projected on the photodetecting means 13. Moreover, even if a part fa (shaded area in FIG. 7) of the effective luminous flux f transmits through the mask pattern 12a and is projected on the photodetecting means 13, the luminous flux fa would be disturbed at its periphery f'a because of the influence of, for example, diffraction due to the external scattering factor P and therefore, the accuracy of detection by the photodetecting means 13 is extremely lowered.

On the contrary, these disadvantage accompanied by the conventional autolensmeter can effectively be eliminated according to the present invention. Namely, the autolensmeter of the present invention comprises optical elements disposed in close vicinity of the mask pattern, whereby the light course and the photodetecting means are in an approximately conjugate relationship. The optical element serves to condense incident light and to project the same onto the photodetecting means. Therefore, in the autolensmeter of the present invention, the width of the opening constituting the mask pattern may substantially be enlarged and thus the amount of light projected on the light-detecting means is surely increased due to the presence of the optical element. This, in turn, makes it possible to increase the width of the effective luminous flux for measurement and to restrict the influence of external scattering factor on the accuracy of measurement to an extremely low level. As a result, the accurate refracting power of lens to be examined can be expected.

PREFERRED EMBODIMENTS OF THE INVENTION

Figure 1:
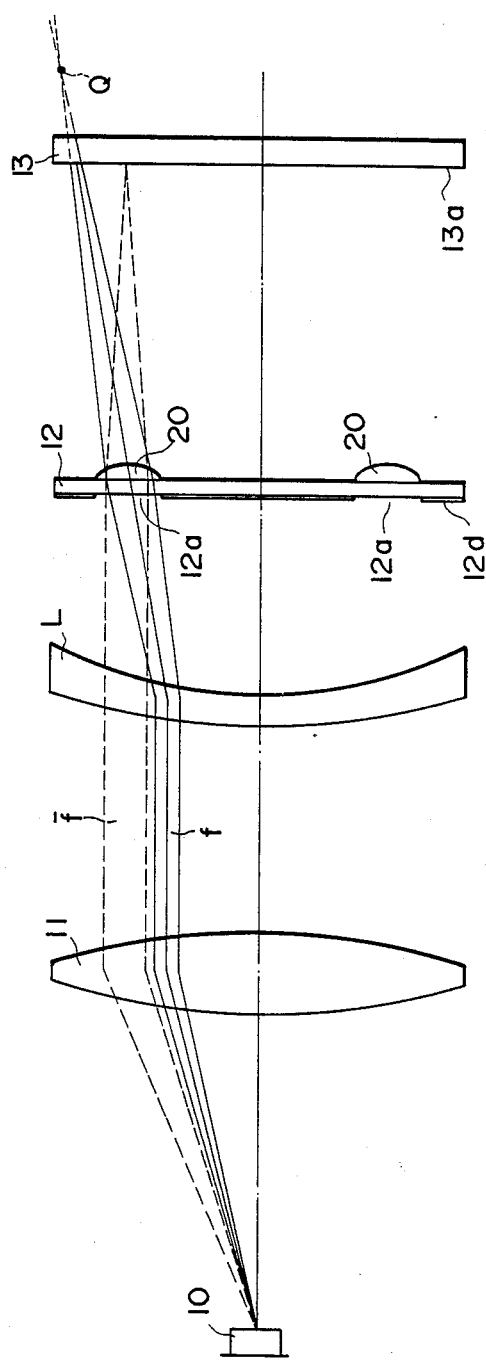

Referring now to the attached FIG. 1, there is shown a preferred embodiment of the autolensmeter according to the present invention. As will be seen from FIG. 1, this embodiment comprises a light-source 10 such as a light emitting diode; a collimetor lens 11 capable of converting the light emitted by the light source 10 to a parallel luminous flux; a mask plate 12 serving as a mask means and having mask pattern 12a as will hereunder be explained in more detail; a photodetecting means 13, for instance, an area CCD disposed behind the mask plate 12 and at a position which is distant apart therefrom in a distance shorter than the minimum focal length of lens to be examined; and cylindrical lens 20 serving as the optical element , each of which is placed before or behind the mask pattern 12a in close vicinity thereof. The lens L to be examined is inserted in place i.e., in the light path of the apparatus between the collimater lens 11 and the mask plate 12 and supported by a lens support (not shown) having a known construction.

Figure 2:
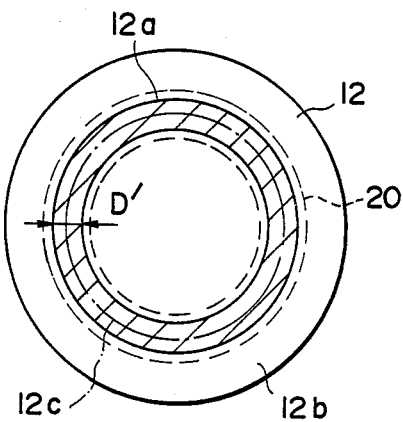
FIG. 2 is a cross-sectional view showing the first embodiment of mask plate of the autolensmeter.

An example of mask pattern 12a is shown in FIG. 2. According to this example, the mask plate 12 is composed of, for instance, a transparent glass substrate 12d and the mask pattern may be formed on the substrate 12d by depositing an opaque film on a desired area of the substrate according to a conventional thin film processes such as vacuum deposition, CVD (chemical vapour deposition), PVD (physical vapour deposition) techniques. In this example, the mask pattern 12a is defined by a circular area ( shaded area) on which film is not deposited at all, while on the remaining area 12b, an opaque film of, for instance, aluminum is formed to prevent light from transmitting and thus the light partially transmits through mask plate 12 and mask pattern 12a. The width of the mask pattern 12a is equal to D' which is wider than that (D) of the conventional one.

Moreover, a ring-shaped cylindrical lens 20 having a longitudinal axis along a circular center line 12c of the mask pattern, as the optical element, is placed behind the mask pattern 12a and bonded to the back surface of the glass substrate 12d. Due to the presence of such ring-shaped cylindrical lens 20, the light source 10 and the light-detecting means 13 are in an optically conjugate relationship with each other. For this reason, when a lens L to be examined is not inserted in the light path of the apparatus, the light emitted from the light source 10 is first converted to a parallel light by the collimator 11 to form an effective luminous flux f, then a part of the effective luminous flux f transmits through the mask pattern 12a and it is condensed and formed in an image, as a circular pattern, on a photodetecting surface 13a of the photodetecting means 13 due to the action of the ring-shaped cylindrical lens 20 (see, broken line in FIG. 1).

While, if a lens L to be examined is located in place, the luminous flux converted to a parallel flux is deflected in proportion to the refracting power of the lens L as is shown by a solid line in FIG. 1 and then projected on the photodetecting surface 13a as a condensed flux so that the image forming point Q is situated behind the photodetecting means 13 due to the action of the cylindrical lens 20.

Figure 3:
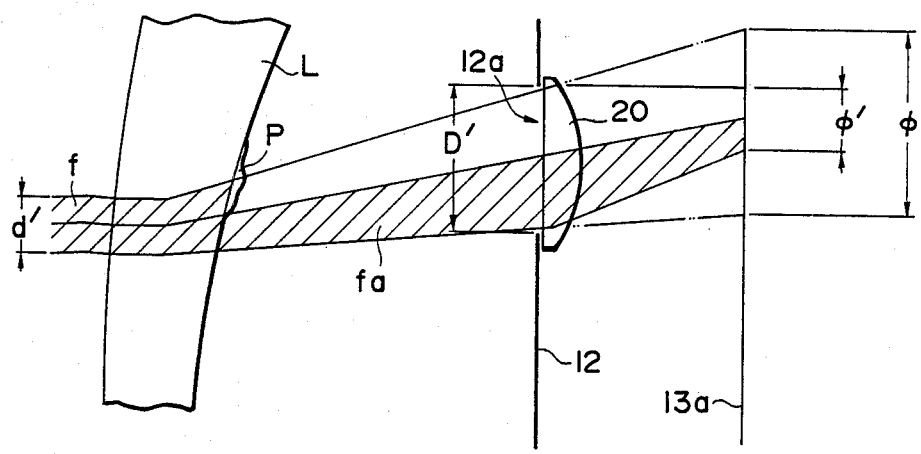
FIG. 3 is a schematic diagram for illustrating light path of the autolensmeter according to the present invention.

According to the autolensmeter of this invention, if the width D' of the mask pattern is enlarged compared with that of the conventional one, the amount of light f reaching the photodetecting surface 13a of the photodetecting means 13 is surely condensed and projected on the surface as a projected luminous flux having a width of 100 ' by the action of the cylindrical lens 20, as shown in FIG. 3. While, the same luminous flux f is projected on the photodetecting means 13 as a projected flux of width $\phi$ according to the conventional autolensmeter which is not equiped with a cylindrical lens (or an optical element). This means that the amount of light projected on the photodetecting means per unit area thereof i.e., per unitary area CCD photodetecting element, becomes quite low in the care of the conventional apparatus. On the contrary, the amount of the projected light per unitary photodetecting element can substantially be increased according to the autolensmeter of this invention as will be apparent from the attached FIG. 3. This means, in turn, that the width D' of the mask pattern 12a can sufficiently be enlarged and that the effective luminous flux for measurement can also be enlarged. Consequently, it is possible, in the apparatus of this invention, to utilize a less sensitive and lens expensive photodetecting device 13 compared with the conventional one. Moreover, a light source of relatively low luminance may also be used in the present invention.

In addition, even if there are some external scattering factors P such as the deposition of dust and/or water drops on the lens L to be inspected and/or the mask plate 12 (in particular) the mask pattern 12a, which largely influence on the accuracy of measurement, the sharpness of the projected pattern is not reduced as must as in the case of the conventional apparatus, since the effective luminous flux f deflected by the lens L is condensed by the cylindrical lens 20 and surely projected on the photodetecting means 13.

When the lens L is one for astigmatism, the pattern projected on the photodetecting means 13 is in the form of an ellipsoid. In this case, the refracting power can be obtained by analyzing the shape and position of the ellipsoidal pattern. In this respect, reference is made to the aforementioned Japanese Patent laid-open No. 57-29923 in which details therefore are disclosed.

Figure 4:
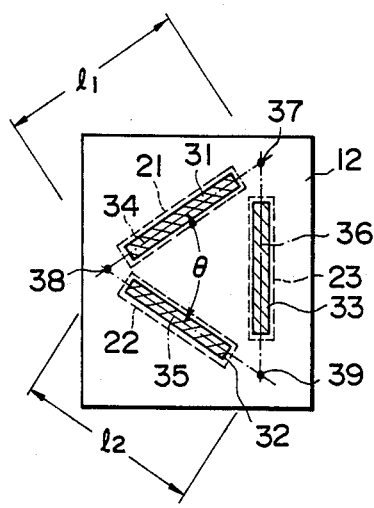
FIG. 4 is a schematic top plane view showing the second embodiment of the mask plate incorporated in the autolensmeter of the present invention.

Then, referring to FIG. 4, the second example of the mask pattern of the autolensmeter according to the present invention is shown. In this example, the mask pattern 12a comprises three rectangular slit-like openings 31, 32 and 33 disposed in a triangular arrangement, each pair of the center lines 34, 35 and 36 thereof intersecting at a point 37, 38 or 39 (imaginary intersecting point).

Moreover, three linear cylindrical lenses 21, 22 and 23 are used as the optical element in this case and they are arranged on the opposite surface of the mask plate 12 so that the longitudinal axis of each lens 21, 22 or 23 is coincident with the corresponding center line 31, 32 or 33.

When using the mask pattern for measuring refracting power of lens L to be examined, there are projected three rectanqular patterns arranged in a triangular form on the photodetecting means 13. From the projected pattern, the refracting power of the lens L can be calculated by formulating the three linear projected patterns into equations, determining the coordinates of the three imaginary intersecting points, and then comparing distances between the intersecting points l1, and l2 and an angle of intersection $\theta$ of the two straight lines with those values observed on the photodetecting means after projecting to calculate the differences between them. The method for determining the refracting power is disclosed in the above-cited Japanese Patent laid-open No. 57-29923, in detail.

Figure 5:
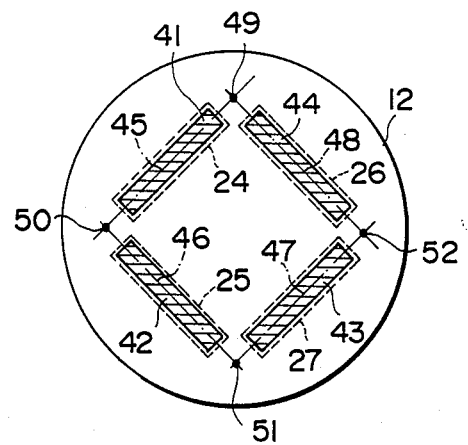
FIG. 5 is a schematic top plane view showing the third embodiment of the mask plate to be incorporated in the autolensmeter of the present invention.

Finally, the third example of the mask plate 12 or pattern 12a according to the present invention is illustrated in FIG. 5. The mask pattern of this example comprises four rectangular slit-like openings 41, 42, 43 and 44 disposed in a rectangular arrangement, each center line 45, 46 47 or 48 of the opening interest with the neighboring one at an imaginary intersecting point 49, 50, 51 or 52.

Moreover, four linear cylindrical lens 24, 25, 26 and 27 are used as the optical element and they are placed on the opposite surface of the mask plate so that the longitudinal axis of each cylindrical lens coincides with the corresponding center line 45, 46, 47 or 48.

According to this example, the refracting power can be calculated as follows. That is, the coordinates of the imaginary intersecting points is first determined by solving equations of the straight lines formulated with respect to the pattern projected on the light-detecting means 13. Then, the coordinates of each imaginary intersecting point thus calculated is compared with the corresponding coordinates thereof on the mask pattern per se to determine the change or difference between them. The detailed method for calculating the refracting power of a lens is described in Japanese Patent laid-open No. 57-199933 filed by Hiroshi Tamaki and assigned to same assignee of this application.

According to the autolensmeter of the present invention, the width of the effective luminous flux for measurement can substantially be enlarged compared with the conventional apparatus due to the presence of optical elements which permits the convergence of light deflected by the lens being examined and therefore, light sources of a low luminance and/or photodetectors of a relatively low sensitivity can be used in the autolensmeter of this invention, which results in the reduction of cost. Furthermore, a relatively high accuracy of the resulting refracting power can be obtained even when there are some external scattering factors such as the deposition of dust and/or water drops on the lens being examined and/or the mask plate (mask pattern).

The autolensmeter according to the present invention has hereinbefore been explained in detail with reference to the non-limitative and preferred embodiments. However, it is not intended to restrict the scope of this invention to those specific embodiments as set forth above, on the contrary, it should be appreciated that the present invention includes various kinds of variations, alternatives, modifications and equivalents as may be included within the scope and spirit of this invention as defined by the appended claims. For instance, the present invention has been described with respect to the autolensmeter in which a two-dimensional position sensor represented by an area CCD is used as the photodetecting means, however, the photodetecting means which can be used in the present invention further includes a rotatable one-dimensional linear position sensor, or a combination of a plurality of such linear position sensors arranged in an intersected state or the like. Moreover, light source other than light emitting diodes may also be used in the present invention.

What is claimed is:

1. An autolensmeter comprising:
   light source means for emitting light;
   collimator means for projecting said light emitted from said light source means as a parallel luminous flux;
   mask means, having a predetermined mask pattern, for transmitting said luminous flux;
   optical means, positioned substantially adjacent to said mask pattern, for condensing and focusing light passing through said predetermined mask pattern of said mask means; and
   photodetecting means, disposed at a position which is substantially conjugate to said light source means relative to said optical means, for receiving a focused pattern of light corresponding to said mask pattern from said optical means, the image distance of said focused pattern of light being subsequently changed by insertion of an optical system to be tested between said collimator means and said mask means, the change in image distance corresponding to the refractive power of the optical system being tested.

2. An autolensmeter comprising:

light source means for emitting light;

collimator means for projecting said light emitted from said light source means as a parallel luminous flux;

mask means for transmitting said luminous flux, said mask means including at least three linear patterns each having a centerline, said centerlines being disposed to intersect at at least three imaginary intersecting points;

optical means, including at least three cylindrical lenses each of which has a longitudinal axis coincident with said centerline of a corresponding one of said at least three linear patterns, said at least three cylindrical lenses being disposed substantially adjacent respective ones of said corresponding linear patterns, for condensing and focusing light passing through said at least three linear patterns of said mask means; and photodetecting means, disposed as a position which is substantially conjugate to said light source means relative to said optical means, for receiving a focused pattern of light corresponding to said at least three linear patterns from said optical means, the image distance of said focused pattern of light being subsequently changed by insertion of an optical system to be tested between said collimator means and said mask means, the change in image distance corresponding to the refractive power of the optical system being tested.

3. The autolensmeter according to claim 2, wherein said photodetecting means is a two-dimensional type position sensor.

4. An autolensmeter comprising:

light source means for emitting light;

collimator means for projecting said light emitted from said light source means as a parallel luminous flux;

mask means, including a circular pattern having a centerline thereof, for transmitting the luminous flux;

optical means, including a ring-shaped cylindrical lens having an axis coincident with said centerline of said circular pattern, said ring shaped lens being disposed substantially adjacent said circular pattern, for condensing and focusing light passing through said circular pattern of said mask means; and photodetecting means, disposed at a position which is substantially conjugate to said light source means relative to said optical means, for receiving a focused pattern of light corresponding to said circular pattern from said optical means, the image distance of said focused pattern of light being subsequently changed by insertion of an optical system to be tested between said collimator means and said mask means, the change in image distance corresponding to the refractive power of the optical system being tested.

5. The autolensmeter according to claim 4, wherein said photodetecting means is a two-dimensional type sensor.

* * * * *